Nov. 7, 1961 L. A. MacDONALD 3,008,076
QUADRATURE VOLTAGE REJECTION APPARATUS FOR SERVO SYSTEMS
Filed Oct. 2, 1959 2 Sheets-Sheet 1

INVENTOR
LESLIE A. MacDONALD
BY
ATTORNEY

Nov. 7, 1961 — L. A. MacDONALD — 3,008,076
QUADRATURE VOLTAGE REJECTION APPARATUS FOR SERVO SYSTEMS
Filed Oct. 2, 1959

INVENTOR
LESLIE A. MacDONALD
BY
ATTORNEY

United States Patent Office 3,008,076
Patented Nov. 7, 1961

3,008,076
QUADRATURE VOLTAGE REJECTION APPARATUS FOR SERVO SYSTEMS
Leslie A. MacDonald, Commack, N.Y., assignor to Sperry Rand Corporation, Great Neck, N.Y., a corporation of Delaware
Filed Oct. 2, 1959, Ser. No. 843,975
7 Claims. (Cl. 318—448)

This invention relates to a means for improving servo systems and more particularly to means for rejecting the undesired quadrature voltage in the error signal of A.C. servo systems.

In conventional closed-loop servo systems, an input control signal is compared with a feedback signal in a summing network to provide an error signal which is usually amplified to drive a servomotor. The error signal in A.C. servo systems will generally include a desirable signal component that is in phase with respect to the input signal and an undesirable quadrature signal component that is 90° out of phase with respect to the input signal. In this disclosure, the phase of the desirable "in-phase" component is with respect to the phase of the input control signal, it being appreciated that the phase of the input control signal may be either in phase with respect to the reference excitation source or 180° out of phase therewith.

In velocity type servo systems, the amplitude of the quadrature component may be appreciably greater than the amplitude of the in-phase component due to phase shift of the feedback signal in the feedback tachometer generator and in the summing network resulting in saturation of the servomotor amplifier before sufficient servomotor speed is attained.

In positional type servo systems, the quadrature voltage results in a position error when there is a phase shift in the summing network and servo motor amplifier, which is usually the case. When the servomotor amplifier is a magnetic amplifier, the position error may be quite large. When the servo system is at a null, the amplified quadrature voltage produces a large output voltage which heats the servomotor unnecessarily.

A common method of quadrature rejection utilizes a chopper in a phase-sensitive demodulator-modulator circuit. However, utilizing a chopper for quadrature rejection requires that the contact dwell time of the chopper remain constant and properly phased to pass the in-phase component of the error signal while rejecting the quadrature component and that the initial trimming of the excitation phase be accurate. However, such is not usually the case because the dwell time of the chopper contact varies considerably with variations in the excitation frequency. Further, phase shift networks which are used to compensate for the manufacturing tolerance of chopper phase shift are subject to variations caused by temperature changes. Aging also causes variations in the phase and dwell time of the chopper contact. In addition, the operating life of the chopper is relatively limited since it is a mechanical vibrating device. Replacement of a chopper in a particular circuit is inconvenient since it requires retrimming of the excitation phase shift network.

It is a primary object of the present invention to provide an electrical quadrature voltage rejection device.

It is an additional object of the present invention to provide a quadrature voltage rejection device which overcomes the inaccuracies of the prior art devices and provides an accurate and reliable apparatus having stable characteristics combined with a long operating life.

A further object of the present invention is to provide a servo system which provides an output proportional to its input without error due to quadrature voltage.

The foregoing objects are achieved by means of a quadrature voltage rejection circuit that is connected in a servo system to receive the error signal. In one embodiment of the invention, a reference voltage having the have frequency and phase as that of the excitation source of the A.C. input signal triggers a gating circuit in the quadrature rejection circuit to open when the reference voltage exceeds a predetermined amplitude each half cycle. The gate opens to pass a large portion of the in-phase component of the error signal and only a small, generally unobjectionable portion of the quadrature component. The gate closes to block the objectionable portion of the quadrature component.

In another embodiment of the invention, two gating circuits and two condensers are used for completely eliminating the quadrature voltage from the output of the quadrature rejection circuit. The first gating circuit is triggered by the negative half cycles of the reference voltage while the second gating circuit is triggered by the positive half cycles of the reference voltage. When the first gate is open, the in-phase voltage charges one of the two condensers depending upon the phase of the error signal while the quadrature voltage charges the two capacitors equally and oppositely. The second gate opens during the second half cycle of the reference voltage and the condensers then discharge through upper and lower portions of a center tapped primary of an output transformer. The in-phase voltage stored on one of the condensers discharges through either the upper or lower half of the primary to provide a useful output while the equal and opposite quadrature voltages discharge through both the upper and lower halves of the primary and thus cancel each other.

The invention will be more fully understood by reference to the accompanying drawings in which.

For purposes of example the present invention will be described with respect to a velocity type servo system.

Figure 1:
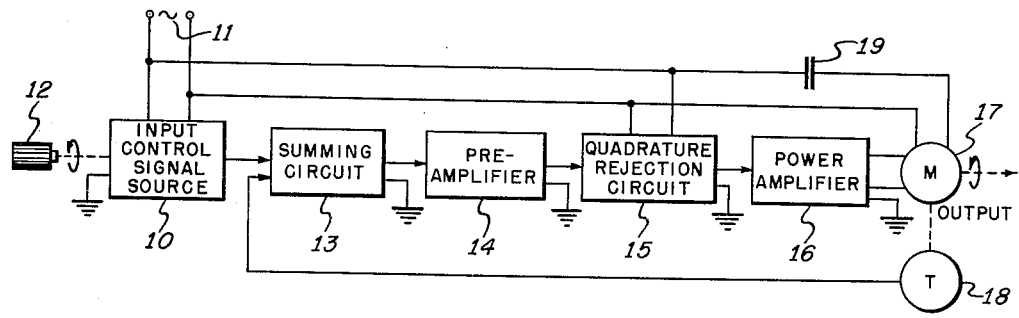
FIG. 1 is a block diagram of a servo system including the quadrature rejection circuit of the present invention.

Referring to FIG. 1, an input control signal source 10 is excited by a reference voltage excitation source 11 which may, for example, have a frequency of 400 cycles per second. A control knob 12 is mechanically connected to the control signal source 10 to adjust the amplitude of the control signal supplied to a summing circuit 13. The summing circuit 13 is connected to a preamplifier 14 which in turn is connected to a quadrature rejection circuit 15. The quadrature rejection circuit 15, which will be explained in more detail subsequently, is also excited by the reference voltage excitation source 11 for reasons to be explained.

The quadrature rejection circuit 15 is connected to a power amplifier 16 which in turn is connected to drive a servomotor 17 at a speed proportional to the input signal. The servomotor 17 is also excited by the excitation source 11 as phase shifted 90°, for example, by a condenser 19. The servomotor 17 is mechanically connected to drive a feedback tachometer generator 18. The tachometer generator 18 provides a feedback signal proportional to its speed to an input terminal of the summing circuit 13 which opposes the input signal from the source 10. The output of the summing circuit 13 is an A.C. error signal equal to the difference between the input and feedback signals. In normal servo operation, the servomotor 17 quickly responds to the input signal and the error signal is maintained at a relatively small amplitude since the feedback signal is very nearly equal to the input signal, assuming a 1:1 summing ratio, at which time the servomotor is rotating at a constant velocity and the velocity error is zero.

From the above description, it will be appreciated that in the absence of a quadrature rejection circuit, the feedback signal must be exactly 180° out of phase with respect to the input signal for the servo system to operate at maximum velocity. Usually, however, phase shift of the feedback signal is introduced by the tachometer generator 18 and the summing circuit 13. This phase shift creates a quadrature voltage 90° out of phase with respect to the input signal that may have an amplitude appreciably greater than the amplitude of the error signal causing the saturation problems stated above. The error signal thus comprises a desirable component that is in phase with respect to the input signal and an undesirable quadrature component that is 90° out of phase with respect to the input signal. The present invention permits a proportionate amount of the in-phase component to drive the servomotor 17 while rendering the quadrature component unobjectionable.

Figure 2:
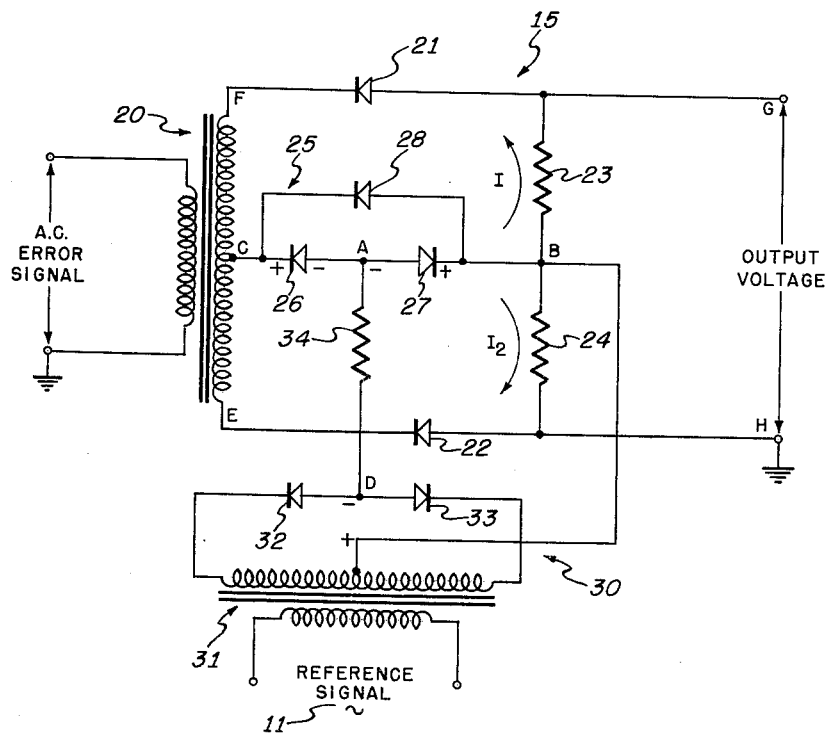
FIG. 2 is a schematic wiring diagram of an embodiment of the quadrature rejection circuit of FIG. 1.

Referring now to FIG. 2 an embodiment of the quadrature rejection circuit 15 of the present invention will be described. An A.C. error signal from pre-amplifier 14 (shown in FIG. 1) is applied across the input terminals of the primary of an input transformer 20. The center tapped secondary of transformer 20 has its upper end connected to the cathode of a diode 21 while its lower end is connected to the cathode of a diode 22. The anode of diode 21 is connected to one end of a load resistor 23. The anode of diode 22 is connected to one end of a load resistor 24. The remaining ends of the resistors 23 and 24 are connected together at a junction B.

The center tap C of the secondary of transformer 20 is connected to the junction B by means of a gating circuit 25. The gating circuit 25 includes a Zener diode 26, a diode 27 and a diode 28. The center tap C is connected to the cathode of diode 26 which in turn has its anode connected at a junction A to the anode of diode 27. The cathode of diode 27 is connected to junction B. The anode of diode 28 is connected to junction B while its cathode is connected to the center tap C, thus providing a shunt path across the diodes 26 and 27.

The quadrature rejection circuit 15 also includes a full wave rectifying circuit 30 which comprises a reference transformer 31 and diodes 32 and 33. The primary of the reference transformer 31 is connected to the reference voltage excitation source 11. The center tapped secondary of transformer 31 has its ends connected to the cathodes of the diodes 32 and 33, respectively. The anodes of the diodes 32 and 33 are connected together at a junction D. Junction D is connected to junction A through a limiting resistor 34. The center tap of the secondary of transformer 31 is connected to junction B.

The junction of the anode of diode 21 and resistor 23 is connected to an output terminal G which in turn is connected to the power amplifier 16 (shown in FIG. 1). The junction of the anode of diode 22 and resistor 24 is connected to an output terminal H which is referenced to ground.

When a reference voltage is applied to the primary of the transformer 31, the voltage across its secondary is full wave rectified by means of the diodes 32 and 33, thus producing a full wave rectified sine wave across the diode 27 with point A negative with respect to point B. The positive voltage at B is conducted through the forward path of the diode 28 to point C. Going from C to B the voltage from the rectified output of the secondary of transformer 31 across the diodes 26 and 27 is equal to the voltage drop across shunting diode 28. The potential difference from C to B due to the reference voltage is therefore zero before Zener diode 26 breaks down and equal to the small forward drop across shunting diode 28 during the period the Zener diode 26 is in the Zener region.

Preferably all the diodes in the circuit are of the silicon junction type. The Zener diode 26 has a Zener breakdown characteristic which permits backward conduction from its cathode to its anode when the reference voltage reaches a predetermined amplitude, for example, two-thirds of the peak amplitude of the reference voltage. Thus, for example, the amplitude of the rectified reference voltage may rise to a peak of 100 volts from D to B and the Zener breakdown value of Zener diode 26 may be 65 volts. When the rectified reference voltage is below 65 volts, the Zener diode 26 passes very little current through its back impedance, thus making the path from C to B a high impedance for positive potentials at C of the secondary of input transformer 20. However, when the rectified reference voltage exceeds 65 volts, the reverse impedance of the Zener diode 26 decreases precipitously to its Zener impedance value of, for example, several hundred ohms and shunting diode 28 passes current in its forward direction. The Zener diode 26 now acts as a voltage regulator to hold the voltage across itself and the diode 27 at the Zener value of 65 volts. The path from C to B for positive potentials at C is now of a low impedance and practically zero potential difference through the Zener impedance of the Zener diode 26 and forward conductance of the diode 27 or through shunting diode 28 which has been made bidirectional by the passage of forward current.

Voltage in excess of 65 volts from the full wave rectifier 30 is dropped across the limiting resistor 34. The limiting resistor 34 has an impedance that is greater than that of the load resistor 23 and 24. For example, the limiting resistor 34 may have a rating of 100K ohms while each of the load resistors 23 and 24 may be rated at 24K ohms.

In the present invention, the gate circuit 25 is triggered by a rectified version of a reference voltage having the same frequency and phase as that of the excitation source of the input signal. This provides a gating action each half cycle that is synchronized with the in-phase component of the error signal in order that a predetermined portion of the in-phase component may be passed by the open gate while the objectionable portion of the quadrature voltage is blocked by the closed gate in a manner to be more fully explained forthwith.

With an A.C. error signal applied to the primary of input transformer 20, the voltage induced in the upper half of the secondary will at a particular time be positive at C and negative at F. At the same time the voltage induced at the lower half of the secondary will be negative at C and positive at E. The voltage in the upper half will be able to pass current through the open gate by way of the diodes 26 and 27 and 28, through the load resistor 23, through the forward conductance of the diode 21 and back to F in the direction indicated by the arrow $I_1$. The voltage in the lower half of the secondary will be negative at C and positive at E. The voltage in the lower half will see a high impedance in diode 22 and therefore will not pass current through the open gate.

When the phase of the error signal reverses so that C is positive with respect to E, current will flow through the open gate by way of the diodes 26, 27 and 28, through the load resistor 24, through the forward conductance of the diode 22 and back to E in the direction indicated by the arrow $I_2$. At this time current is prevented from flowing through the upper half of the secondary by the high impedance of the diode 21.

The quadrature voltage component of the error signal will undergo a phase reversal in the secondary of the transformer 20 during the time gate 25 is open. The quadrature current will therefore first pass through the load resistor 23 and then pass through the load resistor 24 on each half cycle of the reference voltage.

The output voltage of the quadrature rejection circuit 15 taken from G to H is a reproduction of that part of the error signal sine wave impressed upon the primary of the transformer 20 which occurs during the time the gate 25 is open. This can be seen more clearly with reference to the wave forms shown in FIGS. 3 and 4.

Figures 3, 4:
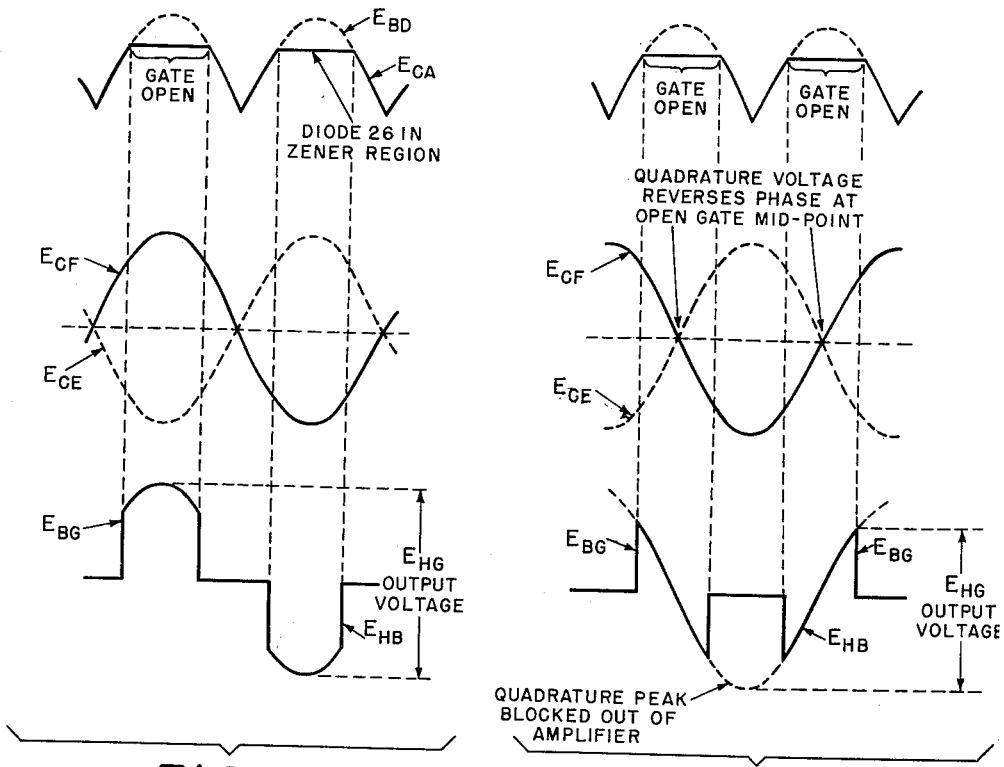
FIG. 3 is a graphical representation of typical waveforms for the circuit of FIG. 2 relating to an error signal that is in phase with the input control signal.
FIG. 4 is a graphical representation of typical waveforms for the circuit of FIG. 2 relating to an error signal in quadrature with the input control signal.

FIG. 3 shows typical waveforms for the circuit of FIG. 2 relating to an in-phase error signal. In the upper waveforms of FIG. 3, the dotted waveform $E_{BD}$ indicates the full wave rectified output of rectifier 30 from B to D. A portion of the dotted waveform $E_{BD}$ is superimposed on waveform $E_{CA}$. The solid line waveform $E_{CA}$ represents the rectified reference voltage from C to A. The flattened portion of each half cycle of the rectified wave $E_{CA}$ indicates when the Zener diode 26 is in its Zener breakdown region thus opening the gate 25. The solid line waveform $E_{CF}$ of the middle waveform of FIG. 3 represents the in-phase voltage from C to F in the upper half of the secondary of transformer 20. The dotted line waveform $E_{CE}$ represents the voltage in the lower half of the secondary from C to E. The output voltage taken from H to G corresponding to the in-phase error signal during the time the gate 25 is open is represented in the lower waveform of FIG. 3.

FIG. 4 shows typical waveforms for the circuit of FIG. 2 relating to a quadrature component of error signal. The upper waveforms of FIG. 4 are identical to the upper waveforms of FIG. 3. The solid line $E_{CF}$ of the middle waveform of FIG. 4 represents the quadrature voltage in the upper half of the secondary of transformer 20 from C to F. The quadrature waveform $E_{CF}$ of FIG. 4 is 90° out of phase with respect to the in-phase waveform $E_{CF}$ of FIG. 3. The quadrature waveform in the lower half of the secondary from C to E is represented as dotted line $E_{CE}$. It will be noted that the quadrature voltage $E_{CF}$ reverses phase at the mid-point of the open gate. The output voltage from H to G corresponding to the quadrature voltage error signal is indicated in the lower waveform of FIG. 4.

From FIG. 4, it will be observed that the peaks of the quadrature voltage are blocked out due to the gate 25 being closed during the time when the quadrature peaks prevail and that the quadrature voltage $E_{BG}$ is equal and opposite the quadrature voltage $E_{HB}$ for each half cycle of the reference voltage. Further, the portion of the quadrature voltage passed by the gate 25 is only a small portion of the overall quadrature voltage error signal. The small portion of the quadrature voltage passed by the gate 25 cannot saturate the power amplifier 16 (shown in FIG. 1) and it is integrated to zero by the action of the servomotor 17 (shown in FIG. 1). The heating effect of this small amount of quadrature voltage is negligible.

A typical error signal will contain a large quadrature component and a small in-phase component. The resultant waveform will be similar to FIG. 4 except that the point of phase reversal will be displaced from the mid-point of the open gate depending upon the magnitude of the in-phase component. Displacement of the phase reversal point to the left of the mid-point could be indicative of an input control voltage in phase with the reference voltage which would drive the servomotor in one direction. Displacement of the phase reversal point to the right of the midpoint would then be indicative of an input control voltage 180° out of phase with the reference voltage and the servomotor would reverse its direction of rotation.

The phase of the output voltage from the quadrature rejection circuit of FIG. 2 is not changed by the action of the gate and the portion of the error signal allowed to pass through the gate to the power amplifier contains all of the information the servomotor requires to drive on. Precision balance of the components of the quadrature rejection circuit is not necessary since the gate circuit 25 forms a common impedance and a slightly unbalanced output from the load resistors 23 and 24 does not effect the phase relationship of the output voltage.

The width of the gate is a function of the Zener breakdown voltage of the Zener diode 26 and the peak amplitude of the reference voltage and it is established on the basis of the amount of quadrature rejection required for a particular servo system. The ratio of the in-phase voltage with respect to the quadrature voltage may be increased by narrowing the width of the gate. A practical limit of gate narrowing exists since the in-phase component may be reduced to a point where excessive amplifier gain may be required. A good compromise which provides effective quadrature rejection and does not attenuate the in-phase component appreciably is obtained with a gate width of $\pi/2$ radians of the reference frequency. This establishes equal periods of alternating gate openings and gate closings. The gate width may also be established to eliminate the undesirable harmonics of the A.C. error signal by making the gate width equal to an integral multiple of the period of an odd numbered harmonic frequency present in the error signal.

Figure 5:
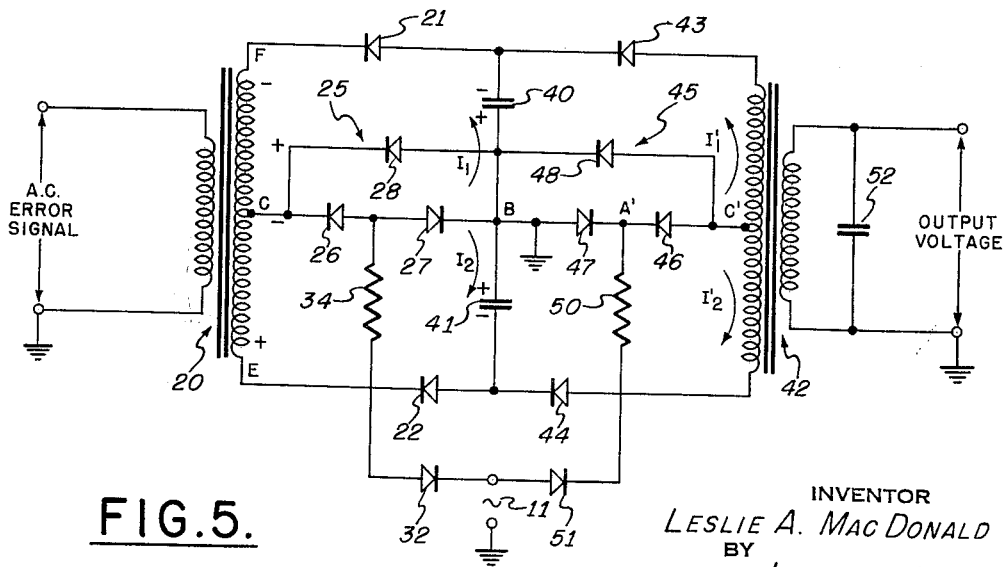
FIG. 5 is a schematic wiring diagram of another embodiment of the quadrature rejection circuit of FIG. 1.

If it is desired to completely eliminate the quadrature voltage, the embodiment of the invention of FIG. 5 may be utilized in lieu of the embodiment shown in FIG. 2. The quadrature rejection circuit of FIG. 5 utilizes two gates with the first gate 25 connected as shown in FIG. 2, with the exceptions that condensers 40 and 41 are substituted for the resistors 23 and 24, respectively; the junction B is referenced to ground; and the diode 32 is connected to reference source 11 and is poled in a direction to conduct on the negative half cycles of the reference voltage.

An output transformer 42 of the circuit of FIG. 5 has a center tapped primary having an upper end connected to the anode of a diode 43 which has its cathode connected to the junction of the diode 21 and the condenser 40. The lower end of the primary of the transformer 42 is connected to the anode of a diode 44 which has its cathode connected to the junction of the diode 22 and the condenser 41. The diodes 43 and 44 isolate the condensers 40 and 41 from each other to prevent the charges on the condensers from equalizing.

A second gating circuit 45 is connected between the center tap C' of the primary of the transformer 42 and the junction B. The gating circuit 45 includes a Zener diode 46, a diode 47 and a diode 48. The center tap C' is connected to the anode of the diode 46 and has its cathode connected to the cathode of the diode 47 at a junction A'. The anode of the diode 47 is connected to the junction B. The anode of the diode 48 is connected to the center tap C' while its cathode is connected to the junction B to provide a shunt path across the diodes 46 and 47. Junction A' is connected through a limiting resistor 50 and a diode 51 to the reference source 11. The diode 51 is poled in a direction to open the gate 45 only on the positive half cycles of the reference voltage.

The secondary of the output transformer 42 is connected to the power amplifier 16 (shown in FIG. 1). A condenser 52 may be connected across the secondary for tuning purposes.

In operation the first gate 25 is open only on the negative half cycles of the reference voltage and the second gate 45 is open only on the positive half cycles of the reference voltage, in a manner similar to that explained with respect to FIG. 2. With an A.C. error signal applied to the primary of transformer 20 which has an in-phase component that makes C positive with respect to F each half cycle the first gate 25 is open then condenser 40 will be charged and the condenser 41 will remain uncharged due to the high impedance of the diode 22. Should a phase reversal of the input control voltage occur such that C is positive with respect to E each half cycle the first gate 25 is open, the in-phase voltage then charges the condenser 41 and does not charge the condenser 40.

The phase sensitive characteristic of the in-phase component of the error signal is therefore determined by the selective charging of one of the condensers 40 or 41.

Since the quadrature voltage reverses phase at the mid-point of the open gate (as shown with respect to FIG. 4), the quadrature voltage charges both the condensers 40 and 41 equally on the same half cycle of the reference voltage.

With the first gate 25 open and an error signal applied to the primary of input transformer 20, the condensers 40 and 41 are charged as explained and the second gate 45 is closed. After the first gate 25 closes, the second gate 45 opens. The second gate 45 provides a discharge path for the condensers 40 and 41 through the upper and lower halves of the center tapped primary of transformer 42 in the directions indicated by the arrows $I'_1$ and $I'_2$ respectively.

The equal charges on the condensers 40 and 41 due to the quadrature voltage cause equal and opposite currents to flow through the upper and lower halves of the primary transformer 42 thereby cancelling the quadrature voltages.

The in-phase voltage which selectively charges condenser 40 or 41 is similarly discharged through the upper or lower half of the primary of transformer 42, respectively, to provide an A.C. output signal in the secondary of transformer 42 of the reference voltage frequency that is proportional to the in-phase component of the error signal in magnitude and preserves its phase characteristics for proper direction of servomotor rotation.

While the invention has been described with respect to a reference voltage having the same frequency and phase as that of the excitation source of the input signal, it will be appreciated that a reference voltage having the same frequency as that of the input signal excitation source which is 180° out of phase therewith may also be utilized to trigger the gates by modifying the quadrature rejecttion circuit in an obvious manner. To state it generally, the input control signal and the reference signal must have the same frequency and be so phased that their zero crossover points are coincident, that is, the phase of the input control signal may either be in phase or 180° out of phase with the reference signal in order that both signals pass through zero at the same time.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A servo system including means for supplying an A.C. error signal at a reference frequency, said signal including a desirable in-phase component and an undesirable quadrature component, a servomotor, quadrature rejection means connected between said error signal supply means and said servomotor, and means for supplying a reference signal at said reference frequency and so phased with respect to said in-phase component that their zero crossover points are coincident, said quadrature rejection circuit including gating means connected between said error signal supply means and said servomotor normally providing a high impedance path therebetween, and full wave rectifying means connected to said reference signal supply means for rectifying said reference signal, said gating means being connected to be responsive to said rectified reference signal for providing a low impedance path for said error signal only when said reference signal exceeds a predetermined amplitude each half cycle for rendering said quadrature component unobjectionable.

2. A servo system including means for supplying an A.C. error signal, said error signal including a desirable in-phase component and an undesirable quadrature component, means for supplying a reference signal, said reference signal and said desirable component of the error signal being so related that their frequencies are the same and so phased that their zero crossover points are coincident, a servomotor, and quadrature rejection means connected between said error signal supply means and said servomotor, said quadrature rejection means comprising an input transformer having a primary connected to receive said error signal and a center tapped secondary, first and second rectifiers respectively connected to the ends of said secondary, said rectifiers being poled to conduct on alternate half cycles of said error signal with respect to each other, first and second load resistors connected at a common junction and to said first and second rectifiers respectively, said first and second load resistors being connected to provide an output signal to said servomotor, said rectifiers and said resistors being electrically balanced with respect to each other, and gating means connected between said center tap and said junction and responsive to said reference signal for providing a low impedance path for said error signal when said reference signal exceeds a predetermined amplitude for rendering said quadrature component unobjectionable.

3. A servo system of the character described in claim 2 wherein said gating means includes a Zener diode having a Zener breakdown characteristic at said predetermined amplitude of the reference signal.

4. A servo system including means for supplying an A.C. error signal, said error signal including a desirable in-phase component and an undesirable quadrature component, means for supplying a reference signal, said reference signal and said desirable component of the error signal being so related that their frequencies are the same and so phased that their zero crossover points are coincident, a servomotor, and quadrature rejection means connected between said error signal supply means and said servomotor, said quadrature rejection means comprising an input transformer having a primary connected to receive said error signal and a center tapped secondary, first and second rectifiers respectively connected to the ends of said secondary, said first and second rectifiers being poled to conduct on alternate half cycles of said error signal with respect to each other, first and second condensers connected at a common junction and to said first and second rectifiers respectively, said rectifiers and said condensers being electrically balanced with respect to each other, a first gating means connected between said secondary center tap and said junction and responsive to said reference signal for providing a low impedance path for said error signal to charge said condensers when said reference signal exceeds a first predetermined amplitude on half cycles of a first predetermined phase, an output transformer having a center tapped primary and a secondary connected to said servomotor, third and fourth rectifiers respectively connected to the ends of said center tapped primary, said third and fourth rectifiers being poled to prevent equalization of the charges on said condensers, a second gating means connected between said junction and said primary center tap and responsive to said reference signal for providing a low impedance discharge path for said condensers through said center tapped primary when said reference signal exceeds a second predetermined amplitude on half cycles of a second predetermined phase whereby said quadrature component is eliminated.

5. A system of the character described in claim 4 wherein said first and second gating circuits include first and second Zener diodes having Zener breakdown characteristics at said first and second predetermined amplitudes respectively.

6. A quadrature voltage rejection circuit for conducting a proportionate amount of a desirable component of an A.C. signal while rendering an undesirable quadrature component of said signal unobjectionable comprising means for supplying a reference signal, said reference signal and said desirable component of the A.C. signal being so related that their frequencies are the same and so phased that their zero crossover points are coincident, an input transformer having a primary adapted to receive said A.C. signal and a center tapped secondary, first and second rectifiers respectively connected to the ends of said secondary, said rectifiers being poled to conduct on alternate half cycles of said A.C. signal with respect to each other, first and second load resistors connected at a common junction and to said first and second rectifiers respectively, said first and second load resistors being connected to provide an output signal, said rectifiers and said resistors being electrically balanced with respect to each other, and gating means connected between said center tap and said junction and responsive to said reference signal for providing a low impedance path for said A.C. signal when said reference signal exceeds a predetermined amplitude for eliminating at least an objectionable portion of said quadrature component in said output signal.

7. A quadrature voltage rejection circuit for conducting a proportionate amount of a desirable component of an A.C. signal while eliminating the undesirable quadrature component of said signal comprising means for supplying a reference signal, said reference signal and said desirable component of the A.C. signal being so related that their frequencies are the same and so phased that their zero crossover points are coincident, an input transformer having a primary adapted to receive said A.C. signal and a center taped secondary, first and second rectifiers respectively connected to the ends of said secondary, said first and second rectifiers being poled to conduct on alternate half cycles of said A.C. signal with respect to each other, first and second condensers connected at a common junction and to said first and second rectifiers respectively, said rectifiers and said condensers being electrically balanced with respect to each other, a first gating means connected between said secondary center tap and said junction and responsive to said reference signal for providing a low impedance path for said A.C. signal to charge said condensers when said reference signal exceeds a first predetermined amplitude on half cycles of a first predetermined phase, an output transformer having a center tapped primary and a secondary adapted to be connected to provide an output signal, third and fourth rectifiers respectively connected to the ends of said center tapped primary, said third and fourth rectifiers being poled to prevent equalization of the charges on said condensers, a second gating means connected between said junction and said primary center tap and responsive to said reference signal for providing a low impedance discharge path for said condensers through said center tapped primary when said reference signal exceeds a second predetermined amplitude on half cycles of a second predetermined phase for eliminating said quadrature component in said output signal.

References Cited in the file of this patent

UNITED STATES PATENTS

| | | |
|---|---|---|
| 2,671,875 | Urbanik | Mar. 9, 1954 |
| 2,881,379 | Logan | Apr. 7, 1959 |